Nov. 17, 1970   C. E. GILES   3,540,128
QUICK SET-UP PRODUCTION PLATE
Filed March 31, 1967   2 Sheets-Sheet 1

INVENTOR.
CHARLES E. GILES
By John Joseph Hall
ATTORNEY.

Nov. 17, 1970  C. E. GILES  3,540,128
QUICK SET-UP PRODUCTION PLATE
Filed March 31, 1967  2 Sheets-Sheet 2
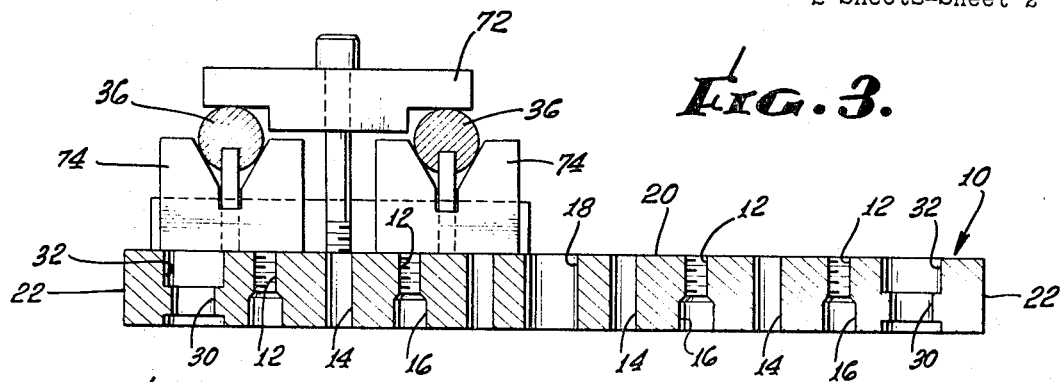
INVENTOR.
CHARLES E. GILES
By John Joseph Hall
ATTORNEY.

United States Patent Office 3,540,128
Patented Nov. 17, 1970

3,540,128
QUICK SET-UP PRODUCTION PLATE
Charles E. Giles, 3654 Overland,
Los Angeles, Calif. 90034
Filed Mar. 31, 1967, Ser. No. 627,540
Int. Cl. B23q *3/00*
U.S. Cl. 33—174                                     1 Claim

ABSTRACT OF THE DISCLOSURE

A ready built base plate is disclosed having a precision made pattern of holes in it that are equally spaced and with a center slip hole or register. This pattern of holes provides quick and proper location and positioning of parts to be machined.

BACKGROUND OF THE INVENTION

Field of invention

This invention pertains to the field of machine tooling providing proper location and support of machine parts while being machined.

Prior art

Applicant knows of no prior art providing a base plate with a precision made pattern of holes which permits quick and proper location and positioning of parts to be machined.

SUMMARY OF THE INVENTION

The invention comprises a new and useful base plate having an unusual pattern of holes in it which provides quick and proper location and positioning of parts to be machined. The base plate has sides and ends that are parallel and square.

The pattern of holes is made up of holes equally spaced from each other. The holes are either threaded or open, i.e., having no threading therein. The open and threaded holes alternate with each other throughout the entire hole pattern.

The pattern has a starting point at the center of the plate which is called a register hole. It is a slip fit or open hole, i.e., unthreaded.

The base plate is so constructed as to permit various accessories secured to the plate by means of bolts from the face side of the plate as well as from the bottom side of the plate, all the while using the same hole in the same location.

Due to the hole pattern provided by my invention, the same hole pattern may be used in all of various accessories, so that the accessories may be positioned anywhere on the plate as desired.

My invention may be advantageously used with various locator devices. In particular, I devised an inside diameter locater comprising a body, three locating rods, a tapered pin, and 4 screws. The body has a hole through it which is threaded on one end, and three other holes, each of which are equally spaced at 120 degrees, to receive locating rods. The locating body is equipped with a shank which is received by the register hole of the plate.

The locating body further receives a tapered pin which can be moved in or out by means of a set screw threaded at the end of the body. As the tapered pin is pushed into the body by adjusting the set screw, it pushes out locating rods on the top of the body to the desired position.

I have also devised an outside locator comprising three round discs which are flat and parallel on two sides. The discs have six holes through their sides, of which three are larger than the remaining three. The large holes are for slip fit pins, while the three small holes are for set screws for securing locating rods.

I have other devices for use with my invention, which will be described hereinafter, in detail along with the preferred embodiments of my invention, as combinations and subcombinations used as part of my invention.

It is, therefore, an object of my invention to provide a ready built and quick set up production plate for use as a base plate for accommodation of all types of machines, particularly machines that remove metal from machine parts.

Another object of my invention is to provide a production plate that will permit the positioning of various accessories anywhere on the plate as desired.

A further object of my invention is to provide a production plate that will permit the securing of various accessories by means of bolts or other means both from the face side of the plate as well as from the bottom side of the plate.

A still further object of my invention is to provide a production plate that permits the use of the same hole in the same location for accessories that are secured to the plate either from the face side of the plate as well as from the bottom side of the plate.

A yet further object of my invention is to provide various locator devices for use in conjunction with my production plate for quick and accurate locating of machine parts to be machined.

These and other objects will be more readily understood by reference to the following specification and claim, taken in conjunction with the accompanying drawings, in which:

FIG. 3 is a view taken on line 3—3 of FIG. 1.

FIG. 4 is a plan view of an embodiment of my invention illustrating its use with various locator devices thereon.

FIG. 5 is a view taken along line 5—5 of FIG. 4.

FIG. 6 is a sectional view taken along line 6—6 of FIG. 4.

Figure 1:
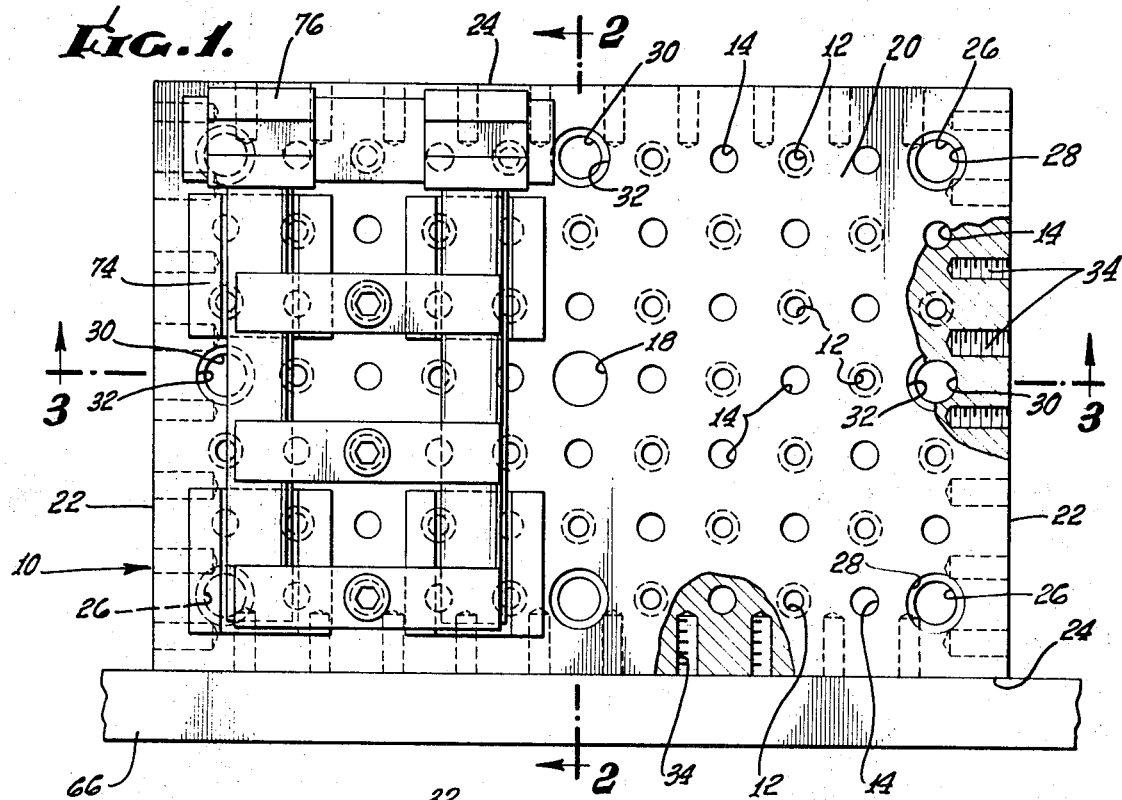
FIG. 1 is an elevational view of an embodiment of my invention with a typical accessory mounted thereon.

With respect to the embodiment of my invention illustrated in FIG. 1 of the drawings, the production plate 10 is generally rectangular in shape, although it may be formed as a square. Preferred dimensions of my plate may vary from a width of 6 inches and a length of 10 inches and a thickness of ⅞ inch, on up to a width of 16 inches, a length of 24 inches, and a thickness of 1¼ inches.

The plate 10 has a plurality of holes 12 which are threaded and a plurality of holes 14 which are unthreaded or slip fit holes. A plurality of holes are provided with a counterbore 16, generally on the back side of threaded holes 12.

Depending on the size of the plate 10, the spacing of the holes 12 and 14 may vary from 1 to 3 inches, so long as the spacing of the holes 12 and 14 remains uniform, and equally spaced over the surface of the production plate 10.

Preferred sizes of the holes 12 and 14 may vary from ¼ inch to ⅝ inch in diameter. The holes 12 and 14 are preferably formed in parallel lines as illustrated in FIG. 1 with the register hole 18 in the center of the plate 10. Preferably, the threaded holes 12 alternate with the open holes 14 in regular rows over the face or top 20 of the plate 10, and are spaced equally one from the other.

The sides 22 of the plate 10 are square and parallel to each other. Also, the ends 24 of the plate 10 are square and parallel to each other.

Preferably, the plate 10 should be made of case hardened steel so that it will not wear, scratch, or dent. The plate 10 should have highly ground surfaces with all locating holes honed.

The register hole 18 is preferably larger than the holes 12 and 14. Preferably, each corner of the plate 10 has a hole 26 similar in size to the register hole 18 with a counterbore 28. In addition, similar holes 30 with counterbores 32 are provided at the ends of rows of holes 12 and 14, which rows intersect the register hole 18 and are at right angles to each other.

The sides 22 and ends 24 of plate 10 may be preferably provided with threaded holes 34. Also, the holes 34 may be all slip fit holes or may have alternating threaded and slip fit holes.

My plate 10 may be used in conjunction with various accessories. For example, V-blocks or gussets 38 may be bolted to plate 10 in various positions and may also be rotated 90 degrees and repositioned in any desirable place.

Various locater devices may also be used with my plate 10 for quick positioning of machine parts for machining.

I have invented an inside diameter locater 40 comprising a body 42, three locating rods 44, a shank 46 formed from the body 42, a tapered pin 48, a set screw 50, and three locating rod set screws 52 threaded into abutment with their respective locating rods 44 and against flat spots 54 thereon.

I have also invented an outside locater 56 comprising a round disc 58 which is flat and has parallel sides. Two sets of holes are cut through the sides 60; one set 62 comprising a series of three holes larger than the second set 64 of smaller holes.

The second set 64 of smaller holes receive set screws which secure locating rods of the outside diameter locater.

The set 62 of larger holes are for slip fit pins.

In operation, the plate 10 is mounted on a conventional machine table (partly shown) by placing step pins into two of the slip fit holes 14 in the center row of plate 10 and into a slot 65 underneath the plate 10 and in the top of the machine table.

Figure 2:
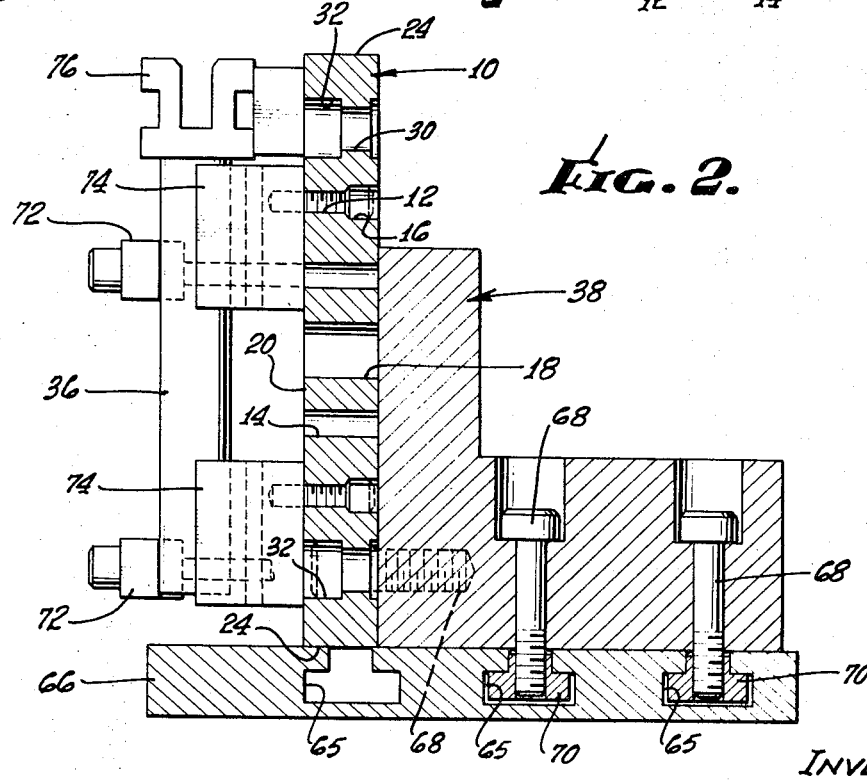
FIG. 2 is a section taken along line 2—2 of FIG. 1.

A portion of the top 66 of such a conventional machine table is shown in FIGS. 1, 2.

The plate 10 is then in place and in position to follow the travel of top 66 of the machine table in the same plane without having to indicate the plate 10. The plate 10 may be secured to the machine table by socket head cap screws 68 inserted through counterbored holes 30 located at the ends 24 of plate 10 by threading the screws into T-nuts (not shown) inserted in slot 65 of the machine table. The plate 10 is then ready to receive various accessories, which may be secured to the plate 10 while the plate is either in a vertical or horizontal position by the use of counterbored holes 26 and 30.

FIG. 2 illustrates the use of gusset 38 in conjunction with plate 10 in a vertical position. Screws 68 secure gusset 38 to the top 66 of a machine table having T-nuts 70 or a T-shaped bar containing threaded holes and inserted in slot 65 underneath the top 66 of the machine table. Plate 10 is secured in a vertical position by socket head cap screws 68 inserted through counterbored holes 32 located at the ends 24 of plate 10 and threaded into corresponding threaded holes in gusset 38.

Meanwhile, screws inserted through holes 12 secure the desired accessory to plate 10. Various accessories or machine parts may be so secured to plate 10 in a vertical or horizontal position as desired.

FIGS. 1, 2, and 3, show a typical accessory having rods 36, T-shaped members 72, V-block members 74, and end members 76, mounted on plate 10.

In operation, my invention further provides for quick location of machine parts for machining by the use of various locater devices. FIG. 4 illustrates the location of a machine part 78 with a radius 80. My inside diameter locater 40 may be used in conjunction with plate 10 by inserting the shank 46 into the register hole 18 of plate 10. Set screw 50 is then turned to push tapered pin 48 in between locating rods 44. The farther in the tapered pin 48 moves in between locating rods 44, the farther the locating rods 44 move out.

The required dimension of the part to be machined is ascertained by using a micrometer to mike across from the body 42 of the inside diameter locater 40 to one end of a locating rod 44 by adjusting it to one-half the diameter required minus half the diameter of the body 42. The other two locating rods 44 are then automatically adjusted. After the adjustment has been made the three locating rods 44 are secured by tightening a set screw 52 against the flat spot 54 on each locating rod 44.

Although I have described my invention in detail with reference to the accompanying drawings illustrating preferred forms of my invention, it is understood that numerous changes in the details of construction and arrangement of parts may be made.

I claim:

1. A quick set-up production plate, comprising: a rectangular plate member having parallel, planar top and bottom sides, square ends parallel to each other and square sides parallel to each other, said plate having a plurality of openings therethrough and a central reference opening, said openings being arranged in a generally symmetrical and precision made pattern in said plate and consisting of a plurality of spaced parallel rows of said openings extending from one end to the other end of the plate and from one side to the other side of the plate, said openings including threaded openings countersunk on the bottom side of the plate for securing parts on the top side of the plate from either the top or bottom side thereof, and smooth slip-fit openings for receiving step pins engageable in slots in the top of a machine table for locating the plate on the machine table and for receiving inside and outside work piece locater devices, each of said openings being equally spaced from each other within each of said rows with a larger opening for said central reference opening, and larger counterbored openings located at each of the corners of the plate and at the middle of each of the sides and ends of the plate for receiving bolts to secure the production plate to a machine table, one of said rows of openings extending from one end to the other end of the plate being in alignment with said reference opening and one of said rows of openings extending from one side to the other side of the plate being in alignment with the reference opening, and an inside work piece locater mounted in one of the smooth slip-fit openings, said inside locater comprising a head member seated on the top side of the plate and having three cylindrical openings therethrough extending radially outwardly from its center, each of said openings having its longitudinal axis in the same plane and parallel to the top side of the plate and forming an angle of 120 degrees with each of the other openings; a hollow shank member extending up into the center of said head member and extending below the bottom of said head member and into said one smooth slip-fit opening and having threads inside its lower end; a pin member inserted in said hollow shank member and having a taper at the tip of its inner end extending into said center of said head member and secured therein by set screw means threaded into the lower end of said shank member; and a locating rod inserted into each of said cylindrical openings with its inner end touching the taper of the inner end of said pin member and with its outer end extending out through said cylindrical openings, each of said rods having a flat spot on top of its mid-portion to receive a set screw and being freely moveable radially within said cylindrical openings; whereby a plurality of different types of work pieces may be quickly and firmly secured to said plate for precision machining.

References Cited

UNITED STATES PATENTS

| | | | |
|---|---|---|---|
| 3,243,885 | 5/1966 | Johnson | 33—174 |
| 3,210,855 | 10/1965 | Carter | 33—191 |
| 2,809,438 | 10/1957 | Ihrig. | |
| 2,707,419 | 5/1955 | Schron | 269—47 |
| 3,229,365 | 1/1966 | Fisher et al. | 29—559 |

SAMUEL S. MATTHEWS, Primary Examiner

U.S. Cl. X.R.

269—47